May 18, 1937. W. T. WEEKLEY 2,080,990
GARMENT HANGER FOR AUTOMOBILES
Filed Aug. 3, 1936

Inventor
William T. Weekley,
By Shepherd & Campbell
Attorney

Patented May 18, 1937

2,080,990

UNITED STATES PATENT OFFICE 2,080,990

GARMENT HANGER FOR AUTOMOBILES

William T. Weekley, Atlanta, Ga.

Application August 3, 1936, Serial No. 94,067

2 Claims. (Cl. 248—215)

This invention relates to a garment supporting device for use in automobiles and it has for its object to provide a simple and inexpensive article, bent from a single and continuous piece of wire or flat bar metal and so shaped as to adapt it to not only hook over the upper edge of the pane or sheet of glass constituting an automobile side window, but to grip the same with such cushioned resiliency as to be firmly held in place and to avoid any objectionable rattling. Further, the bends of the metal by which the necessary resiliency is imparted to the article are utilized to constitute projections upon which garments, such as coats, hats, and the like, may be hung.

Other objects and advantages of the invention will be set forth in detail in the description which follows.

In the accompanying drawing.

Like numerals designate corresponding parts throughout the several views of the drawing.

Figure 2:
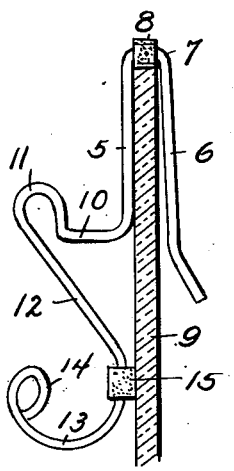
Fig. 2 is a view like Fig. 1 showing the device mounted upon the window glass of an automobile and with the parts in the position which they occupy when sprung and under tension.
Figure 3:
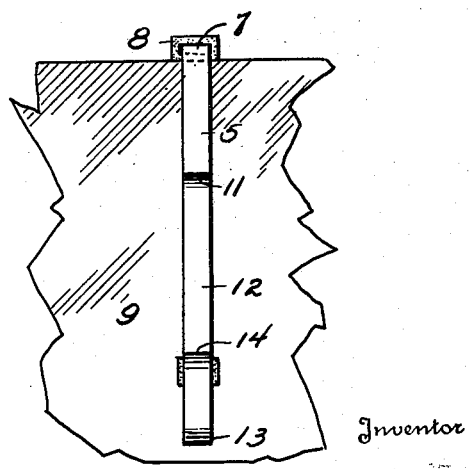
Fig. 3 is a front elevation of the structure of the device.

The hanger of the present invention comprises a single piece of resilient metal of any suitable thickness and width but preferably about the proportions shown, the upper portion of which is bent to inverted U-shape to constitute the legs 5 and 6 joined by the bowed portion 7. A cushioning ring or block of rubber, felt, or other suitable material encircles the bowed portion 7 and is adapted, when the device is in place upon the upper edge of the glass of an automobile window, (indicated at 9, in Fig. 2), to rest upon the upper edge of said glass and cushion the structure at that point. This cushioning element also aids in preventing chipping of the upper edge of the glass. The lower end of the leg 6 is flared downwardly as indicated at 6ª to facilitate the application of the device and the lower end of the leg 5 is bent outwardly to form a substantially horizontal portion 10 and is then bent to the bowed formation indicated at 11. The metal is then continued to form the downwardly and inwardly inclined brace leg 12.

The metal is continued from the leg 12 to form the substantially semicircular portion 13, which terminates in the smaller, preferably closed, loop 14. A block or ring 15 of rubber or other cushioning material is disposed at the junction of brace leg 12 and semicircular portion 13 so that this block constitutes the element which contacts the face of the glass. Thus rattling and damage to the glass are effectively prevented. This rubber element 15 also provides a frictional engagement between the hanger and the glass to an extent that would be wholly lacking in the contact of metal with glass. Thus, this rubber ring not only prevents rattling or scratching of the glass, but it aids in preventing any tendency of the garment hanger to swing or twist out of the vertical.

Further, it provides a retaining means for a hat brim if the latter be slipped up beneath the hanger so that its brim will lie and be gripped between the rubber block and the glass. The thrust of this rubber block is directly toward the glass under the resilient action of the parts, as hereinafter described.

Figure 1:
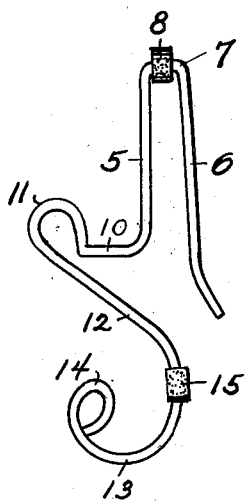
Figure 1 is a side elevation of a garment hanger constructed in accordance with the present invention, showing the parts in the position that they occupy when the device is not under tension.

By referring to Fig. 1 it will be seen that when the article is not in place upon a window the spring action of the bowed portion 11 causes the block 15 to lie materially to the right of the inner face of the leg 5. Thus, in order to apply the device to the glass of the window the parts must be flexed to bring them to the position illustrated in Fig. 2, where block 15 has been moved materially to the left, the spring portion has been flexed and the whole structure is engaged with the glass under such tension as to hold it firmly in place and prevent rattling.

The bowed spring portion 11 not only constitutes a spring member to serve the function set forth but it forms an upstanding hook or projection over which various articles of apparel may be engaged. In like manner the terminal loop 14 is caused to constitute a hanger hook over which articles may be engaged.

It is a well known fact that most automobiles lack facilities for effectively holding garments that are not in use. Robe rails are employed but under the jolting of the automobile coats and other garments frequently slip to the floor.

Further, it is not possible to hang hats upon a robe rail and the need for a simple hat hanger is especially apparent because hats are easily damaged and the loss from hats crushed in automobiles amounts to a very large sum. Persons going on automobile trips place their hats in what they believe to be safe positions only to find, at the end of the trip, that the jolting of the car or the shifting of the baggage has caused the hat to fall to the floor where it has been crushed by some one stepping upon it.

The device of the present invention is of particular advantage in that it utilizes space that is otherwise wasted. The rear windows of most modern automobiles, when lowered as far as possible, still project several inches above the metal portion of the door and several hats or coats may hang upon the inner sides of the doors in space not otherwise utilized.

I am aware of the fact that it has heretofore been proposed to provide garment hangers adapted to hook over the tops of ordinary household doors. However, the structures proposed for that purpose were never intended nor adapted for use upon automobile windows in the manner herein described. It is clear that many ways will readily suggest themselves to interested persons of bending resilient metal into shapes other than that herein described for engagement over the window glass of an automobile door. Consequently I wish it to be understood that the invention is not limited to the precise arrangement shown but that it includes within its purview whatever changes fairly come within either the terms or the spirit of the appended claims.

Having described my invention, what I claim is:

1. The combination with a garment hanger of the character consisting of a single and continuous piece of resilient metal bent to form a portion of inverted U-shape, adapted to engage over the upper edge of the window glass of an automobile, one of the legs of said portion of inverted U-shape being bent outwardly at its lower end, the outwardly bent portion being continued at its outer end to form an upwardly directed resilient bowed portion, said bowed portion being continued downwardly and inwardly to form a brace leg, the metal being continued from the brace leg to form an outwardly directed curved portion, and the positioning of the parts being such that when the part of inverted U-shape is engaged over the upper edge of the glass of an automobile door, the resilient loop is flexed outwardly; of a soft and resilient cushioning and gripping member disposed at the juncture of the brace leg and the last named outwardly curved portion, the flexing of the loop causing the brace leg to be placed under such tension as to thrust said resilient member bodily and directly toward the side face of the glass of the window and forcibly against an object to be held between said member and said glass.

2. The combination with a garment hanger of the type comprising a single piece of metal bent to form an upper part adapted to snugly engage over the upper edge of an automobile window, a lower part adapted to bear against a side face of the glass of the window, and a connecting resilient member between said two parts which is placed under tension when said upper part is engaged over the upper edge of the glass pane of an automobile window and which tends to move said lower part toward the side face of said window; of a rubber cushioning and gripping member carried by said lower part opposite its point of contact with the glass of the window, which member is thrust bodily toward the glass of the window under the tension of the connecting member to forcibly engage an object to be held between said member and the face of the glass.

WILLIAM T. WEEKLEY.